Patented Aug. 29, 1933

1,924,441

UNITED STATES PATENT OFFICE 1,924,441

PROCESS FOR PREPARING CYCLOHEXYL-AMINES

Georg Kränzlein, Martin Corell, and Wilhelm Döhle, Hochst-on-the-Main, Germany, assignors to General Aniline Works, Inc., New York, N. Y., a corporation of Delaware No Drawing. Application November 10, 1926, Serial No. 147,612, and in Germany November 19, 1925

7 Claims. (Cl. 260—128)

Our present invention relates to the preparation of aryl-cyclohexylamines.

We have found that aryl-cyclohexylamines can be produced by subjecting a compound of the type: R—NH—X, wherein R is an aromatic radical which may contain further substituents and X may be hydrogen, alkyl or aryl, to reaction with halogen cyclohexanes, preferably in presence of a catalyst and an acid binding agent. In many cases it is advantageous to use an excess of the aromatic amine which reacts as the acid binding agent. Our new process can be carried out in a simple manner and gives an excellent yield.

The following examples serve to illustrate our invention, but they are not intended to limit it thereto:

1. 163 parts of bromocyclohexane are heated to boiling with 186 parts of aniline and a small amount of copper under reflux until the reaction is complete. The reaction product, when cooled, is acidified with hydrochloric acid whereupon the difficultly soluble hydrochloride of monocyclohexylaniline separates. After having filtered the mass by suction and decomposed it by means of a diluted alkali, the thus obtained free base distills over in a vacuum under a pressure of 15 mm at 142° C. It corresponds most probably to the following formula:

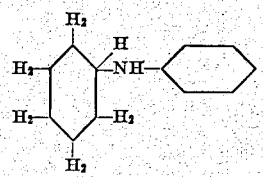

By analysis of the base the following figures were found:

Calculated on $C_{12}H_{17}N$

| | | | |
|---|---|---|---|
| C | 82,05% | C | 82,28% |
| H | 9,83% | H | 9,71% |
| N | 8,30% | N | 8,00% |

Other bases, such as for instance toluidine, naphthylamine, chloraniline, monomethylaniline, diphenylamine, carbazol, react in an analogous manner. By using for the reaction 2 molecules of bromocyclohexane and, for instance, one molecule of sodium acetate and operating as indicated in Example 1, a dicyclohexylaniline is produced.

It will be readily understood that the bromocyclohexane may be replaced by chlorocyclohexane. When using bases of the anthraquinone series the reaction takes also an easy course.

2. Into 186 parts of aniline there are slowly introduced drop by drop and while stirring at 125° C. 163 parts of bromocyclohexane; the mass is then stirred for 2 hours and is then allowed to cool. The separated hydrobromide of aniline is filtered by suction, the filtrate is decomposed with aqueous alkali and the resulting oil is subjected to a fractional distillation in a vacuum. The fraction which distills over at 140–150° C. under 15 mm pressure consists of pure cyclohexylaniline.

3. Into 186 parts of aniline there are introduced drop by drop while stirring, 177 parts of ortho-bromomethylcyclohexane, the stirring of the mass is continued for 2 hours, and the mass is then worked up as indicated in Example 2. The methylcyclohexylaniline formed distills over at 146–152° under a pressure of 15 mm. It corresponds most probably to the following formula:

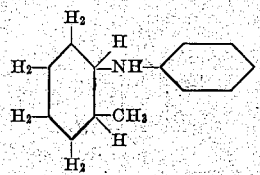

4. Into 242 parts of monoethylaniline there are introduced drop by drop while stirring, at 125–130° C. 163 parts of bromocyclohexane, and the mass is further stirred for some hours. The product is worked up as indicated in Example 2. The cyclohexylethylaniline boils under 15 mm pressure at 148–152° C. When starting from monomethylaniline and bromocyclohexane, cyclohexylmethylaniline is obtained which boils at 145–148° C. under a pressure of 15 mm.

5. 65 parts of α-aminoanthraquinone are heated to gently boiling with 50 parts of bromocyclohexane and an addition of 150 parts of nitrobenzene and 0,5 part of copper powder. After a short time a dark condensation-product has separated which is filtered by suction and washed with hot alcohol. The resulting condensation product dissolves in concentrated sulfuric acid to an intense olive-brown solution. By pouring this solution into water the new product is reprecipitated in the form of brown flakes. It corresponds most probably to the formula:

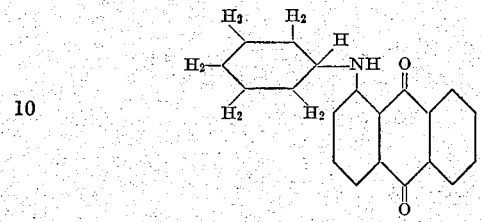

In lieu of the α-aminoanthraquinone other aminoanthraquinones may be used, for instance β-aminoanthraquinone, 1,4-aminochloranthraquinone, diaminoanthraquinones or the like.

We claim:
1. The process which comprises heating a mono-halogencyclohexane with a compound of the type:

wherein R is an aromatic radical and X stands for hydrogen or alkyl.

2. The process which comprises heating to boiling a mixture of a mono-halogencyclohexane and a compound of the type:

R—NH—X, wherein R is an aromatic radical and X stands for hydrogen or alkyl, in the presence of an acid binding agent and a small amount of copper powder.

3. As new products the compounds of the general formula:

wherein X stands for the residue of a primary or secondary aromatic amine, and Y stands for alkyl.

4. As new products the compounds of the general formula:

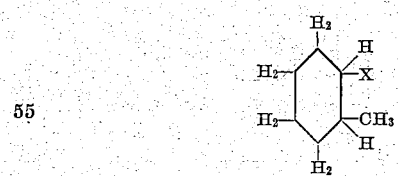

wherein X stands for the residue of a primary or secondary aromatic amine.

5. As a new product the compound of the probable formula:

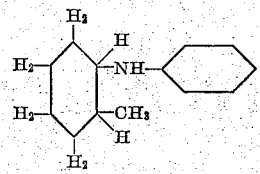

distilling over at 146–152° C. under a pressure of 15 mm.

6. The process which comprises heating to boiling a mixture of a compound of the following formula:

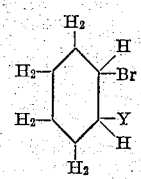

wherein Y stands for hydrogen or methyl, and a compound of the type:

R—NH.X wherein R stands for an aromatic radical and X stands for hydrogen or alkyl, in the presence of an acid binding agent and a small amount of copper powder.

7. The process which comprises heating to boiling a mixture of a compound of the following formula:

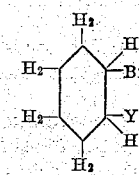

wherein Y stands for hydrogen or methyl, and aniline in the presence of an acid binding agent and a small amount of copper powder.

GEORG KRÄNZLEIN.
MARTIN CORELL.
WILHELM DÖHLE.